United States Patent [19]
Heikkilä et al.

[11] Patent Number: 5,961,784
[45] Date of Patent: Oct. 5, 1999

[54] METHOD FOR REDUCING THE CONSUMPTION OF FRESH WATER IN A PAPER MILL BY MEANS OF A COOLING TOWER

[75] Inventors: Pertti Heikkilä, Raisio; Henrik Pettersson, Mynämäki; Iikka Sipilä, Raisio; Markku Saarinen, Paattinen; Rainer Gartz, Korka, all of Finland

[73] Assignee: Valmet Corporation, Helsinki, Finland

[21] Appl. No.: 08/862,585

[22] Filed: May 23, 1997

[30] Foreign Application Priority Data

May 23, 1996 [FI] Finland ..................................... 962178

[51] Int. Cl.$^6$ ................................ D21F 5/00; D21F 1/66; D21C 3/06; D21C 11/06
[52] U.S. Cl. ........................... 162/189; 162/47; 162/201; 162/375; 162/210; 165/909; 165/900; 261/158; 261/DIG. 11
[58] Field of Search ............................. 162/47, 201, 375, 162/210, 190, 264, 189; 165/900, 909, 47 BW, 47 B; 261/158, 159, 160, DIG. 11

[56] References Cited

U.S. PATENT DOCUMENTS

| | | | |
|---|---|---|---|
| 3,988,201 | 10/1976 | Smith, Jr. ................................. | 162/290 |
| 4,519,446 | 5/1985 | Elmore et al. ........................... | 165/900 |
| 4,913,710 | 4/1990 | Reverdy .................................. | 55/257.1 |
| 5,302,247 | 4/1994 | Richardsen et al. ...................... | 162/47 |
| 5,417,809 | 5/1995 | Hoffman et al. ......................... | 162/190 |

FOREIGN PATENT DOCUMENTS

| | | |
|---|---|---|
| 0115377 | 3/1988 | European Pat. Off. . |
| 962176 | 5/1996 | Finland . |
| 962177 | 5/1996 | Finland . |
| 1482002 | 8/1977 | United Kingdom . |

*Primary Examiner*—Peter Chin
*Assistant Examiner*—Kevin Cronin
*Attorney, Agent, or Firm*—Steinberg & Raskin, P. C.

[57] ABSTRACT

A method for reducing the consumption of fresh water and energy in a paper mill in which fresh water is passed into the paper mill for various needs, and a cooling tower is utilized for cooling water heated in the papermaking process. All fresh waters or a substantial proportion of the fresh waters of the paper mill are introduced into the process through the water system of the cooling tower. The cooling tower includes at least one inlet for passing the water to be cooled into the cooling tower, nozzles for discharging the water that was passed in and that is to be cooled onto heat transfer faces, filler pieces and/or filler plates, which disperse the water to be cooled so as to increase the contact area between the water and the cooling air, at least one outlet for passing the cooled water out of the cooling tower, and blowers for blowing the cooling air through the cooling tower. The cooling tower is composed of cooling modules, each of which includes the elements mentioned above, and the number and the height of the cooling modules is selected in accordance with the requirement of cooling capacity. The cooling modules are interconnected mechanically in parallel and connected selectively and optimally in view of the flow of the cooling air and the flow of the water to be cooled.

17 Claims, 8 Drawing Sheets

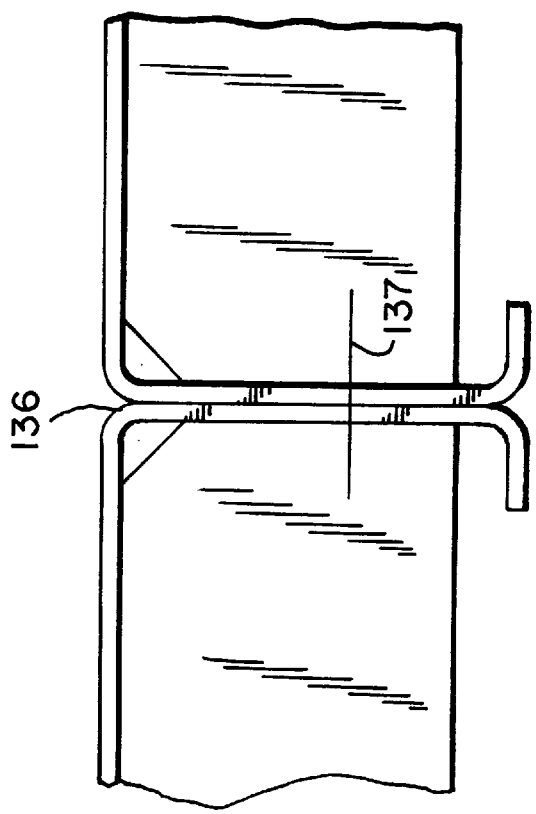
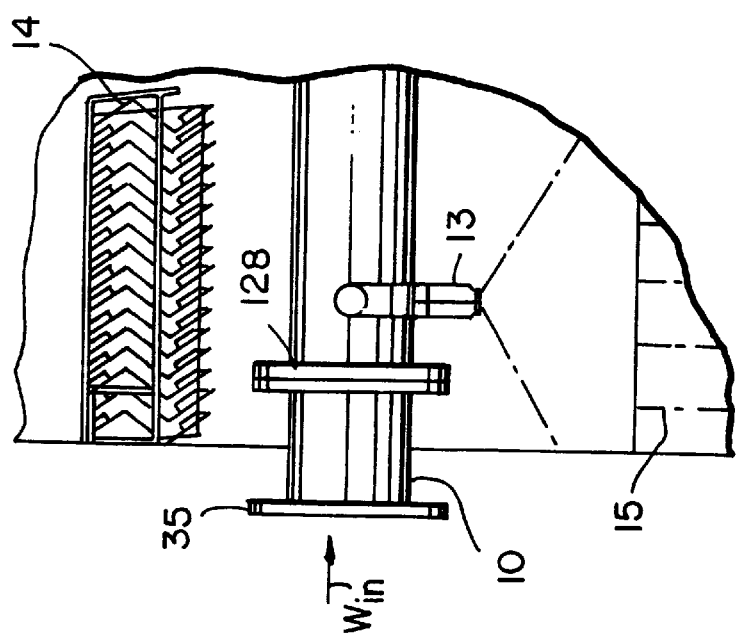

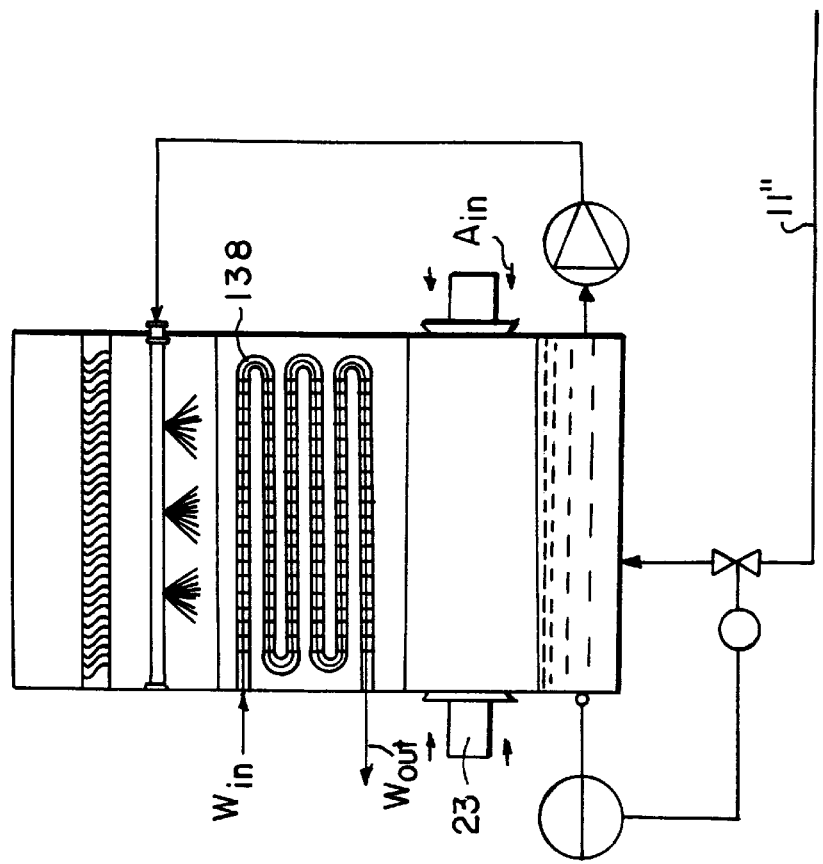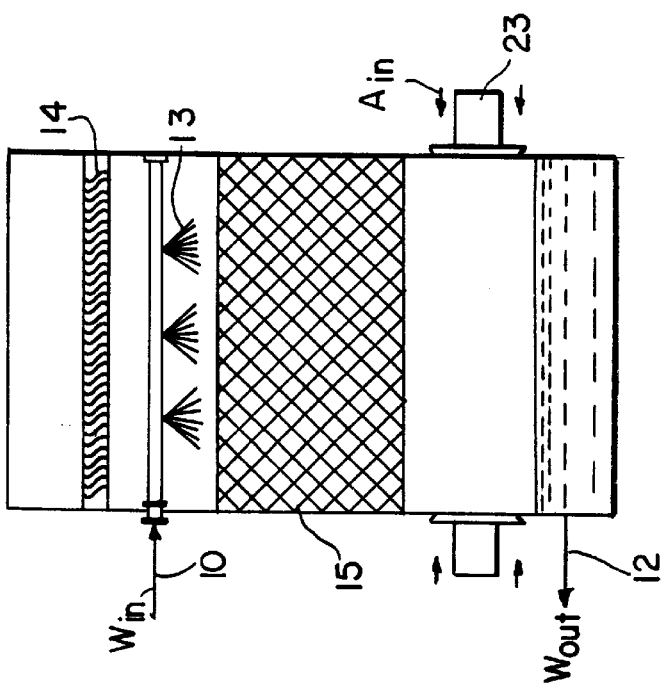

METHOD FOR REDUCING THE CONSUMPTION OF FRESH WATER IN A PAPER MILL BY MEANS OF A COOLING TOWER

FIELD OF THE INVENTION

The present invention relates to a method for reducing the consumption of fresh water and energy in a paper mill, in which fresh water is passed into the paper mill for various uses and a cooling tower is utilized for cooling water heated during the papermaking process.

The present invention also relates to a cooling tower in which there is at least one inlet for passing the water to be cooled into the cooling tower, nozzles or equivalent for discharging the water that was passed in and that is to be cooled onto heat transfer faces, filler pieces and/or filler plates, which disperse the water to be cooled so as to increase the contact area between the water and the cooling air, at least one outlet for passing the cooled water out of the cooling tower, as well as blowers for blowing the cooling air through the cooling tower, whereby the air is heated as the water is cooled.

BACKGROUND OF THE INVENTION

In typical prior art paper mills, an abundance of fresh water is needed for cooling and for washing requirements in the wire part and the press section of the paper machine and for dilution in the pulp preparation plant.

Fresh raw water is usually cold and fresh (non-salt) surface water, which is taken from rivers and/or lakes. This raw water must be purified chemically before use. Raw water is used, among other things, as supplementary water as well as for washing requirements in the production of pulp and paper, and it must be heated before use.

As is well known in the art of paper production, the production of pulp and paper consumes an abundance of thermal and electric energy, which is transferred into the circulation and cooling waters. The major part of the thermal energy that is lost is first in the form of steam, which is condensed by means of cold fresh water in condensers. A certain proportion of thermal energy is transferred to warm water in pulp and paper mills through various indirect heat exchangers. Of the warm water obtained from condensers and heat exchangers, only a part ends up in useful use, and the excess amount passes into the sewer. Owing to changes in the production of paper, the consumption of cold and warm fresh water varies, which causes changes in the properties of different waters, such as in its temperature and pH value, resulting in uneven quality of the pulp and paper produced therefrom. Cooling waters that flow into conventional biological treatment plants, which are situated on the way to the sewer, have a negative effect on the efficiency and costs of the treatment of the outgoing process and waste water.

As known in the prior art, the heated cooling water coming from condensers and heat exchangers is recirculated into an air cooling tower, in which the evaporating water is lost into the atmosphere. The outlet water from the cooling tower passes back into the condensers and heat exchangers. The evaporation and the growth of micro-organisms that take place in the cooling tower have the effect that chemical treatment, purification, and exchanging of the water are necessary in order to maintain the cooling efficiency.

The cooling tower is a heat exchanger for cooling of water, which cooling generally takes place by means of a direct contact between the cooling air and the liquid to be cooled. The cooling occurs in a manner such that the water is allowed to flow over a contact face as large as possible at the same time as this face is cooled by means of cooling air, which is introduced from outside the tower. The contact face consists of filler pieces and/or sets of plates in the cooling tower, and the function of these pieces or plates is to maximize the contact face between the cooling air and the water to be cooled. The principle of operation is primarily based on what is called "evaporative cooling", because the relatively high enthalpy of vaporization of water provides a relatively high takeoff of energy from the water phase even if the evaporation is not particularly abundant.

From the prior art, cooling towers are known which operate with a natural draught or with a cross-flow or counter-flow principle. Most often, the cooling towers are provided with blowers. When the cooling requirement is higher (larger flows of water), smaller units are often connected in parallel into larger units.

OBJECTS AND SUMMARY OF THE INVENTION

Accordingly, a principal object of the method in accordance with the present invention is to reduce the consumption of fresh water in a paper mill.

Another object of the present invention is to provide a novel cooling tower which is well suitable for carrying out the method of the present invention in that it reduces the consumption of fresh water in a paper mill. However, it should be emphasized that the cooling tower in accordance with the present invention is also suitable for use in other method and process environments, besides those explicitly disclosed herein.

Still another object of the invention, when a cooling tower is applied, is to minimize the usage of fresh water in the paper mill.

It is another object of the present invention to provide a new and improved cooling tower in which certain drawbacks of prior art cooling towers are eliminated. The drawbacks of the prior art cooling towers have included the poor suitability of their constructions and operation for variations in the cooling capacity. Further drawbacks are also the large size, in particular the height, of the cooling tower and its appearance that disturbs the environment, as well as noise, mist and other emission drawbacks. The noise drawbacks are particularly emphasized in such prior art cooling towers in which, for circulation of the cooling air, a large propeller placed in the top portion of the cooling tower is used, whose noise attenuation is difficult or even impossible.

It is a further object of the present invention to provide a cooling tower whose cooling capacity can be regulated within quite wide limits in order to meet the requirements imposed by the particular application.

It is a further object of the present invention to provide a new and improved cooling tower whose detrimental effects on the environment can be minimized. In view of achieving this object, the invention provides a cooling tower which produces less noise and less emissions of drops and mist, compared with prior art cooling towers, and which can be constructed so that its height is lower than in the prior art in view of reducing the drawback in respect of the landscape.

It is another important object of the present invention to provide a cooling tower whose cooling capacity can, owing to the modular construction, first be dimensioned in accordance with the requirement of capacity at each particular time, and additionally so that the capacity can be later, if needed, increased or even reduced and/or be decentralized in the paper mill to the vicinity of the points at which requirement of cooling occurs, without expensive changes in construction.

It is still another important object of the present invention to provide a cooling tower whose connections in respect of the circulation of the cooling waters can be arranged optimally, and in which these couplings can also be changed later readily in compliance with the requirements of operation at each particular time.

In view of achieving the objects stated above and others, in the method in accordance with the invention, at least a substantial portion of the fresh water being passed into the paper mill is introduced into the paper mill through the water system associated with the cooling tower. Preferably, all of the fresh water being passed into the paper mill is introduced through the water system associated with the cooling tower. In certain embodiments of the method, the water heated in the papermaking process and the cooled water from the cooling tower are passed into at least one condenser device in the water system associated with the cooling tower whereby warm water is obtained and this warm water is directed into the cooling tower to be cooled. The amount of warm water being passed to the cooling tower to be cooled is optionally regulated. Also, the fresh water may be introduced through the water system associated with the cooling tower by passing the fresh water into the condenser device (s) and regulating the flow of fresh water being passed therein. Further, it is possible to pass at least a portion of the warm water from the condenser device(s) into a buffer storage tank, and utilize the warm water in the buffer storage tank in the paper mill as a substitute for fresh water. The warm water in the buffer storage tank may also be stored with warm water coming from the paper mill. The cooling tower may be provided with an adjustable cooling capacity to determine the regulation of the flow of fresh water being passed into the condenser device(s).

The cooling tower in accordance with the invention is composed of cooling modules, each of which includes at least one inlet through which water to be cooled is passed into the cooling module, heat transfer faces, nozzle means for discharging the water to be cooled onto the heat transfer faces, filler pieces and/or filler plates for dispersing the water to be cooled so as to increase the contact area between the water and a flow of cooling air, at least one outlet through which the cooled water is passed out of the cooling module, and blow means for blowing the cooling air through the cooling module. The number and the height of these cooling modules have been chosen in accordance with the requirement of cooling capacity. The cooling modules are interconnected mechanically in parallel and connected selectively and optimally in view of the flow of the cooling air and the flow of the water to be cooled.

Even though, above and in the following, a cooling tower is spoken of, this does not necessarily imply a high and narrow construction (as is standard in most conventional cooling towers), but owing to the present invention the cooling tower can be favorably made as quite a low construction (or relatively low compared with typical existing cooling towers) which does not disturb the surrounding landscape.

As examples of particularly advantageous environments of application of the present invention, reference is made to the current assignee's Finnish Patent Applications Nos. 962176 and 962177 filed on May 23, 1996, i.e., at the same time with the priority application of this patent application.

In the following, a number of different preferred exemplifying embodiments of the invention will be described, but in this connection it should be emphasized that a cooling tower in accordance with the present invention does not necessarily always include the characteristic features described in the following, at least not all of them at the same time.

The invention is applied preferably in a paper mill in which the circulations of water are arranged so that the circulations are closed fully or partly and the wash waters from the fabrics and other devices in the paper machine, as well as the waters drained from the paper web that is being produced, are collected selectively based on the place of origin of the waters, and that at least part of the collected various waters are cleaned by means of cleaning systems of their own, and the cleaned waters are circulated to applications of reuse suitable from the point of view of their washing potentials in the papermaking process. In view of the foregoing, a paper mill can be provided that requires a smaller amount of fresh water since some of the water from selected locations in the paper mill is collected, and which is relatively clean, and is reused for certain applications for which absolutely clean fresh water is not required.

In the cooling tower, water is cooled which has been heated in condensers and heat exchangers. The water system of the cooling tower is connected with the rest of the water circulation in the paper mill in order to minimize the usage of fresh water.

By means of the present invention, a novel, low-noise cooling tower construction is provided, which operates by means of air blowing, which possesses wide possibilities of connection and regulation, and by whose means the temperatures and quantities of the water to be cooled and the cooling air and water can be taken into account. The requirement of cooling in the tower can be reduced by introducing the desired/necessary quantity of cold fresh water into the cooled water coming out from the cooling tower.

It has been estimated that an optimally arranged use of cooling water and fresh water in accordance with the present invention reduces the burdening of the environment considerably and is more advantageous than the abundant and often unlimited use of fresh water with the resulting need to clean the fresh water.

Since the cooling tower in accordance with the invention has a modular construction, its cooling capacity can be dimensioned initially for a certain application, and can always be changed later, in compliance with the requirements of the modified environment of operation. The modular construction in accordance with the invention also permits different alternatives of connection and circulation of the water to be cooled, in view of producing an optimal cooling effect in each particular case. Owing to the modular construction, the cooling tower can be constructed to be easy to service, with a low height, and to meet even strict environmental requirements in respect of appearance, emissions and noise. The modular construction of the cooling tower also permits the use of applications of a decentralized cooling system.

The cooling tower in accordance with the invention has been constructed so that it produces little noise. In view of reducing noise, noise attenuators and/or insulators are used at the intake side and in the top portion of the cooling tower. If necessary, the cooling tower can also be designed and constructed to meet very strict noise elimination requirements, for example Lp (1 m)=65 dB(A). Sound insulation plates also prevent mixing of warm moist exhaust air with the intake air, which mixing would reduce the efficiency of the tower. The cooling tower has low emissions of air, water, and chemicals.

By means of a cooling tower in accordance with the invention, a good, desirable regulation capacity is achieved by arranging the cooling air blowers so that their speed of rotation is adjustable or by using two-speed blowers and/or blowers with adjustable rotor blades.

The cooling tower is free-standing, made of a solid construction and requires little space, and it can be made wide if it desirable to have a cooling tower with a lower than conventional height, which is accordingly less visible.

It is a particular characteristic of the cooling tower in accordance with the invention that it is made of prefabricated elements, i.e., the cooling tower is composed of so-called modules. Thus, its construction can be made flexibly in a desired size and dimensioned in compliance with the available space therefor. The cooling modules are preferably composed of standardized wall elements, which are made, for example, of SS 2343 acid-proof stainless steel and which elements are joined together by means of bolt joints and sealing material. The height of each module is dimensioned in compliance with the desired requirement of cooling efficiency. The height and width are also variables from the point of view of the cooling capacity.

Generally speaking, in connection with cooling towers, a notion of what is called "approach temperature" is spoken of, which means the difference between the wet temperatures of the cooled water and the incoming air. The smaller this difference is, the more efficient is the cooling tower. The modular construction in accordance with the invention permits the use of smaller steps in increasing the capacity of the cooling tower when attempts are made to reduce this difference in temperature, so that this can be carried out with lower investment costs.

The operation of the cooling tower is also more reliable than in the prior art, because of the smaller units, and it can be serviced more easily than in the prior art, because its top portion includes detachable drop separator elements or drop traps. The walls may also be provided with openings for cleaning and servicing. The walls also retain and include the interior parts of the water jet pipes, which can be disassembled readily. The sound attenuators and insulators can be removed easily from the intake side of the blowers.

By means of the cooling tower in accordance with the invention, the cooling capacity can be regulated in three different ways as necessary:

1) by means of the number and/or dimensioning and/or locations and/or connections of the modules; the higher the number of modules used, the higher the cooling capacity that is obtained;
2) by means of the dimensioning of the layer of filler pieces, it is also possible to regulate the cooling capacity, because with higher constructions of filler pieces, a longer contact time and thus a more efficient cooling are achieved;
3) the air blowers are provided with a regulated speed of rotation, or they are two-speed blowers, and when several blowers are used, they can be regulated on/off and/or for different speeds, whereby the cooling can be affected;
4) by regulating the quantity of fresh water, in which connection, correspondingly, the quantity of cooling air is regulated, or vice versa.

In the following, some preferred exemplifying embodiments of the invention will be described in detail with reference to the figures in the accompanying drawings. However, the invention is not confined to the details of the illustrated embodiments alone.

BRIEF DESCRIPTION OF THE DRAWINGS

Additional objects of the invention will be apparent from the following description of the preferred embodiment thereof taken in conjunction with the accompanying non-limiting drawings, in which:

FIG. 7A illustrates a detail X in FIG. 2;

FIG. 7B is a horizontal sectional view taken along the line A—A in FIG. 4;

FIG. 8A is a sectional view of a cooling tower in which the cooling is based on a direct air-water contact; and FIG. 8B shows a preferred embodiment of a cooling tower in accordance with the invention provided with a closed circulation of water.

DETAILED DESCRIPTION OF THE PREFERRED EMBODIMENTS

Figure 1:
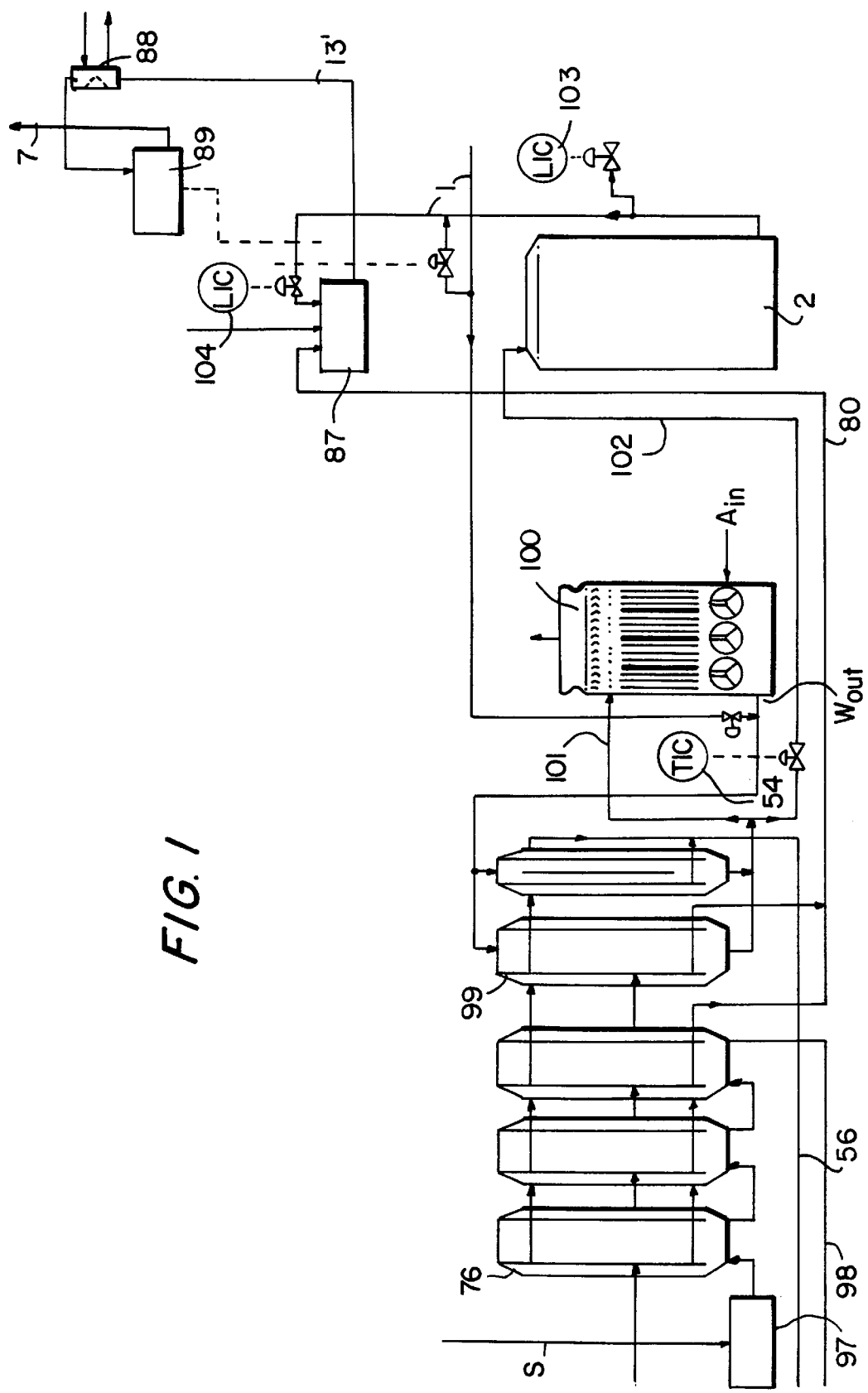
FIG. 1 is a schematic illustration of the part of the papermaking process and its water circulations with which the cooling tower is connected.

Referring to FIGS. 1–8B wherein like reference numerals refer to the same or similar elements, as shown in FIG. 1, fresh water is introduced into the water circulation of a cooling tower 100 associated with, e.g., a paper mill, along a duct 1. When used herein, a duct denotes not only a standard duct but also anything through which a flow is passed, e.g., a pipe. The rejects from the waters cleaned in the paper mill are brought along a duct S into a tank 97 to be fed into one or more evaporators 76 in which they are separated into steam, clean condensate and rejects. The rejects are removed from the evaporators 76 along a duct 98, and the steam passes through one or more cooling devices and/or one or more condensers 99 to condense and the condensed water is then directed into the cooling tower 100. In the condensers 99, concentrates and a warm water are formed. The concentrates from the condenser 99 or condensers are passed away along a duct 56. The clean condensate from the evaporators 76 is passed along a duct 80 into a warm water tank 87. The steam from the evaporators 76 passes into the condensers 99, to which cooling water is passed from the cooling tower 100. The temperature of the cooling water from the cooling tower 100 is regulated by means of a regulator 54. The water that became warm in the condensers 99 is passed into a top portion of the cooling tower 100 along a duct 101.

In a preferred embodiment of the invention as shown in FIG. 1, fresh water is passed into a warm water tank 2 for fresh water along a duct 102 after passing through condensers 99. From the warm water tank 87, water is passed through a heat exchanger 88 into a hot water tank 89 along a duct 13', for example, to be used as jet water in the press section and in the wire part. Surface level regulators 103 and 104 in the tanks 2 and 87 operate jointly so that the supply of water into the tank 87 is secured and maintained. Any excess amount of warm water is passed to other uses. Part of the fresh water is, however, also passed directly into the warm water tank 87 along the duct 1. Warm water coming from the paper machine may also be directed into the warm water tank 87, also referred to herein as a buffer storage tank, and stored with the warm water from the condensers 99.

FIGS. 2–7 are detailed illustrations of preferred exemplifying embodiments of the construction of a cooling tower 100 in accordance with the invention. The water Win to be cooled is passed in along ducts 10. The water to be cooled is sprayed or discharged in a downward direction through nozzles 13 or other comparable members. Above the nozzles 13, there is a so-called drop trap 14, by whose means passage of the cooling air directly upwards is prevented in order that the drops of the water to be cooled should become large enough and not pass out along with the air. The drop trap 14 can be disassembled readily and moved out of the way for servicing operations. The water to be cooled runs down along filler plates and/or pieces 15, by whose means a maximally large contact face is provided between the water flow, Win→Wout, to be cooled and the cooling air flow, Ain→Aout. The height of the space occupied by these filler plates or pieces 15 can be dimensioned so that a sufficiently long contact time and, thus, a sufficiently efficient cooling effect are obtained. The cooled water Wout comes out through a duct 17. In the cooling tower, at the outlet of the cooling air Aout, there is a noise attenuator and, moreover, sound insulation elements 19,19', which are arranged at the sides of the cooling tower. The sound insulation elements 19,19' also ensure that the cold air Ain comes from below, and thereby access of heated and moistened air back into the air circulation Ain→Aout is prevented. The function of a bottom basin 20 is to collect the cooled water after the cooling. Reference numeral 21 denotes wall and support constructions of the cooling tower. The blowers by whose means the cooling air Ain is blown into the cooling tower are denoted by reference numerals 23.

Figure 3:
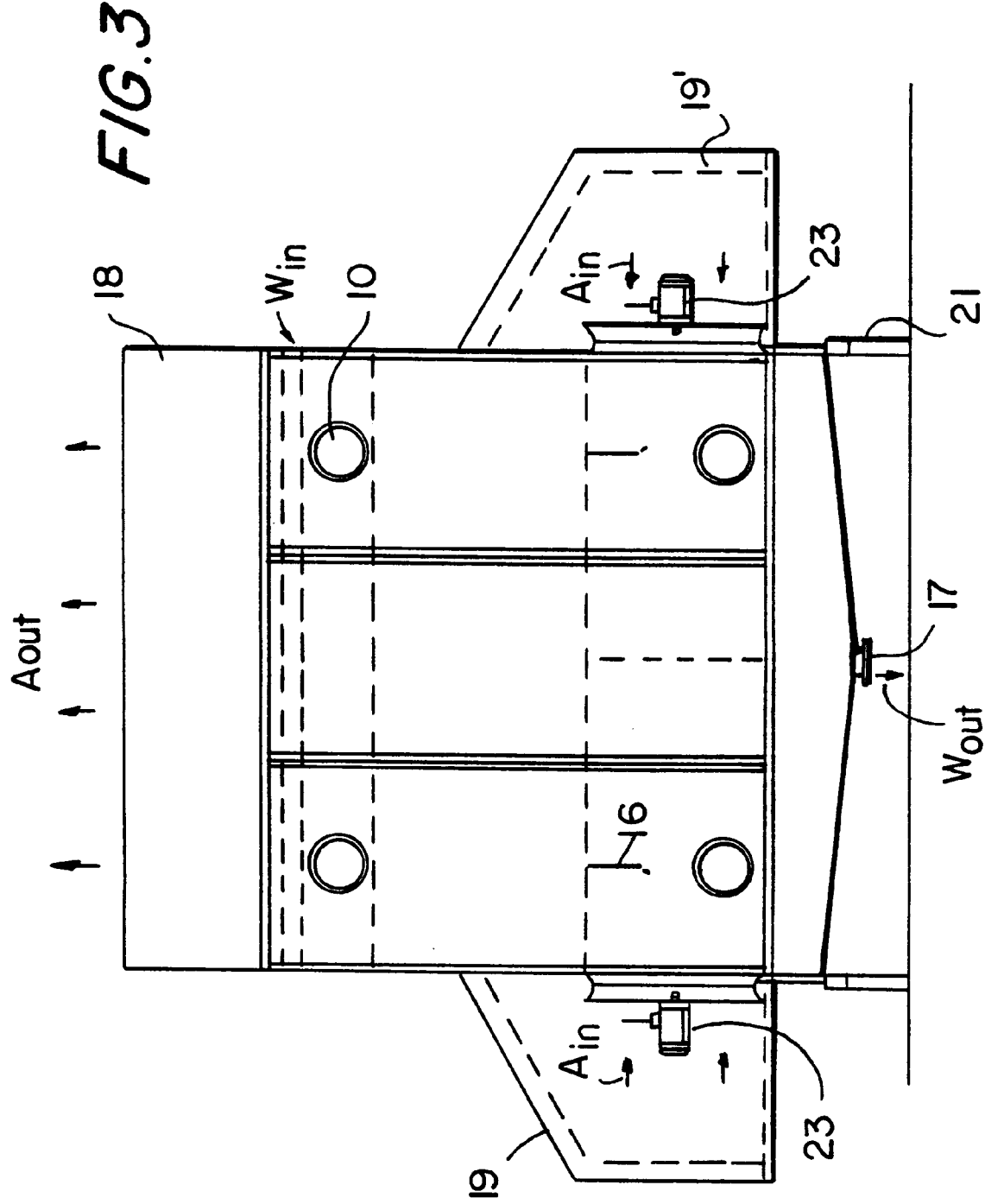
FIG. 3 is an end view of a cooling tower in accordance with the invention.

In FIG. 3, an end view of the cooling tower is shown. The water Win to be cooled is passed into the cooling tower along the ducts 10. The cooling air Ain is blown into the cooling tower by means of blowers 23. FIG. 3 also shows air guide plates 16, by whose means air is guided upwards. The cooled water Wout is passed out through the duct 17. Further, FIG. 3 shows the additional sound attenuator 18 and the sound insulation elements 19,19', which are arranged at the sides of the cooling tower, as well as the support constructions of the walls of the cooling tower, which support constructions are denoted by reference numeral 21.

Figure 4:
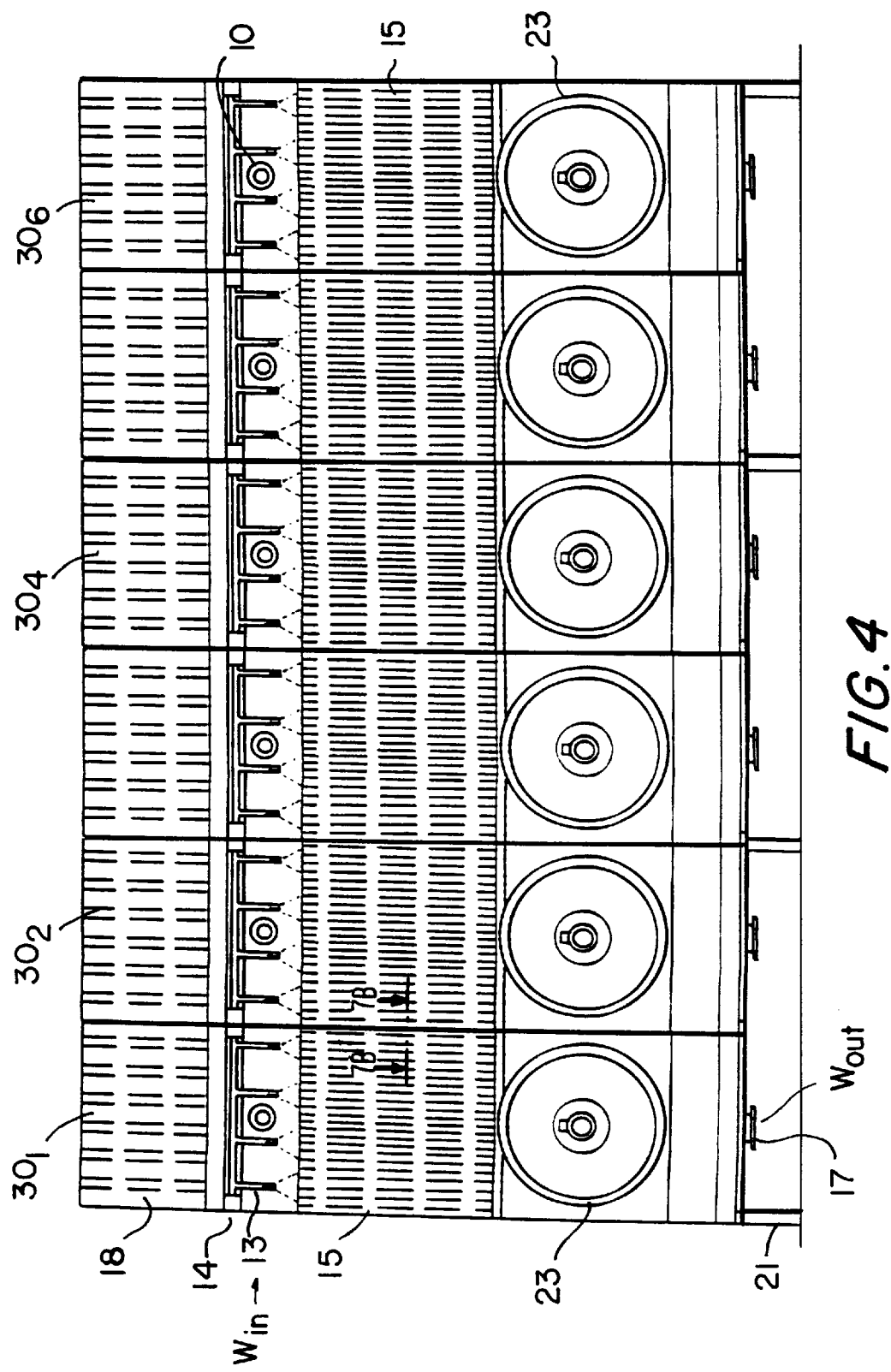
FIG. 4 is a sectional view of a cooling tower in accordance with the invention, showing the modular construction of the tower.

FIG. 4 shows the modular construction of the cooling tower in accordance with the invention. As shown in FIG. 4, the cooling tower is composed of six mutually identical cooling modules $30_1, \ldots, 30_6$ which are interconnected mechanically by suitable connecting means with the larger vertical faces against one another. The modules $30_1, \ldots, _N$ (N=6) are elements of the shape of a rectangular prism, each of which includes two blowers 23 in the lower portion of the shorter vertical wall (one on each side). The modules $30_1 \ldots 30_N$ are connected in parallel both in respect of the cooling air flow Ain→Aout and in respect of the water flow Win→Wout to be cooled. In respect of the water flow to be cooled, different connections are also possible, and the water to be cooled can be passed into the different modules $30_1, \ldots, 30_N$ from different sources, and the water flows Wout to be cooled can be passed to different applications of use depending on their quantities and temperatures. Also, different operational blocks can be arranged in the cooling tower by connecting one or several elements 30 in parallel in order to cool different flows of water. Thus, the modular construction in accordance with the present invention permits a large variety of different cooling capacities and selective cooling and passing further of different water flows, depending on the requirements of use. Between the modules 30, there can be a partition wall, in which case the different water flows can be kept apart from one another.

Figure 5B:
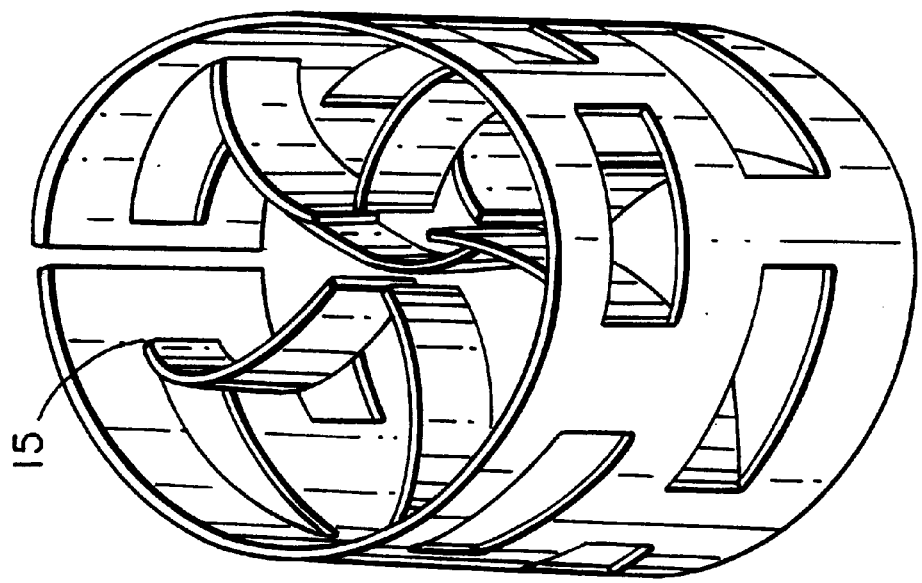
FIGS. 5A and 5B show two exemplifying embodiments of a filler piece usable in a cooling tower in accordance with the invention.
Figure 5A:
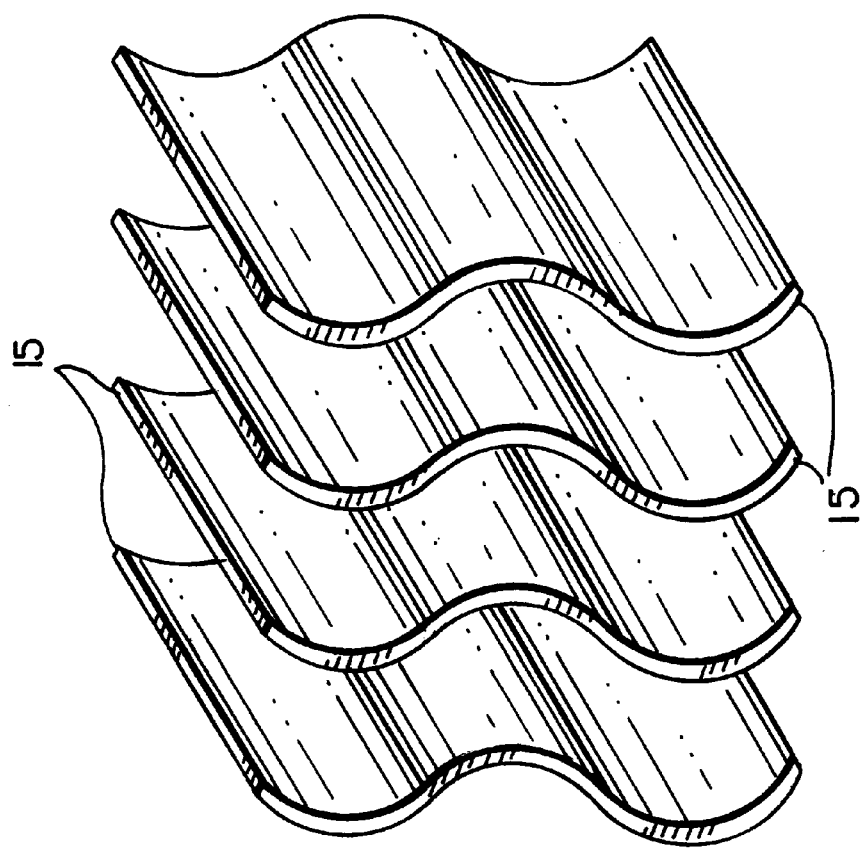

FIGS. 5A and 5B show two exemplifying embodiments of filler pieces and plates 15 which may be used in a cooling tower in accordance with the invention. In FIG. 5A, the water to be cooled flows down along the wave-shaped faces of the filler plates 15, and the liquid film thus formed increases the cooling contact face. The concept underlying the filler pieces shown in FIG. 5B is to disperse the water to be cooled, by means of its complex component faces, into smaller drops in order to increase the contact face.

Figure 6A:
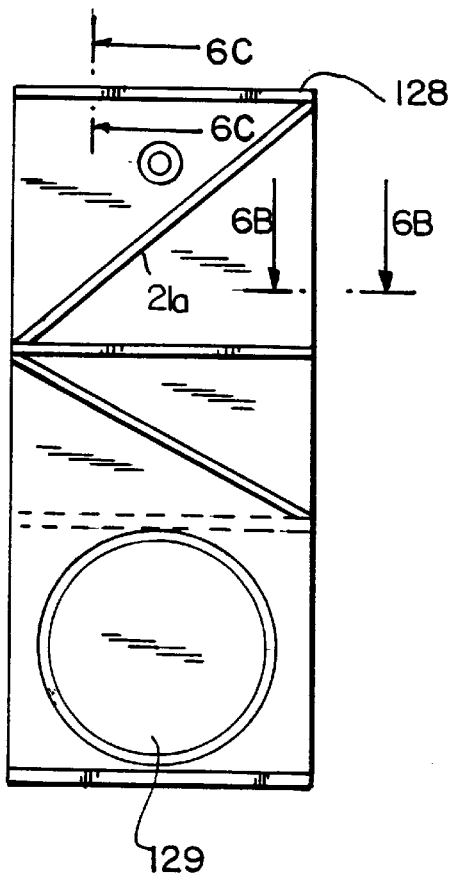
FIG. 6A is a front view of a preferred embodiment of a wall element in a cooling module in accordance with the invention.
Figure 6B:
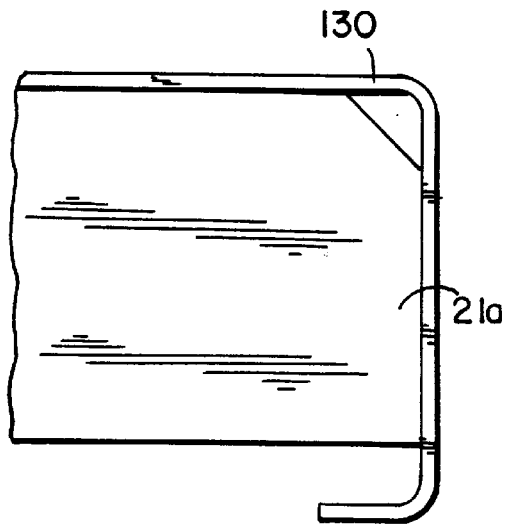
FIG. 6B is a horizontal sectional view taken along the line B—B in FIG. 6A.
Figure 6C:
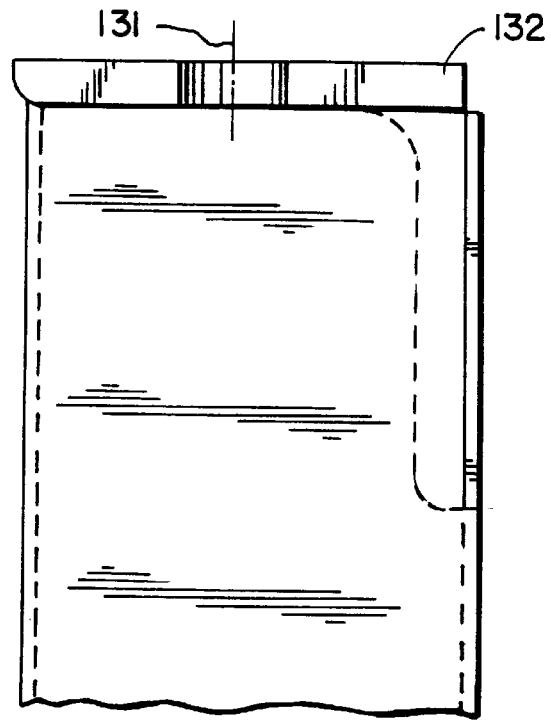
FIG. 6C is a vertical sectional view taken along the line C—C in FIG. 6A.

FIGS. 6A, 6B and 6C illustrate a wall element 128 of a cooling tower module 30, which element is made, for example, of acid-proof stainless steel. Reference numeral 129 denotes a flange joint for a blower 23. FIGS. 6A, 6B and 6C show support constructions 21 of the cooling tower 100. FIG. 6B is a vertical sectional view taken along the line B—B in FIG. 6A. Elements 130 are made, e.g., of 2–3 mm thick acid-proof stainless steel or equivalent by bending. The element 130 includes, for example, a flat-bar rigidifier 21a. FIG. 6C is a sectional view in the plane C—C indicated in FIG. 6A. Reference numeral 131 denotes bolt holes for the flange joint, for example, for fixing of sound attenuators. FIG. 6C also shows an angular section profile 132 fixed to the element 130 wall by welding.

Figure 2:
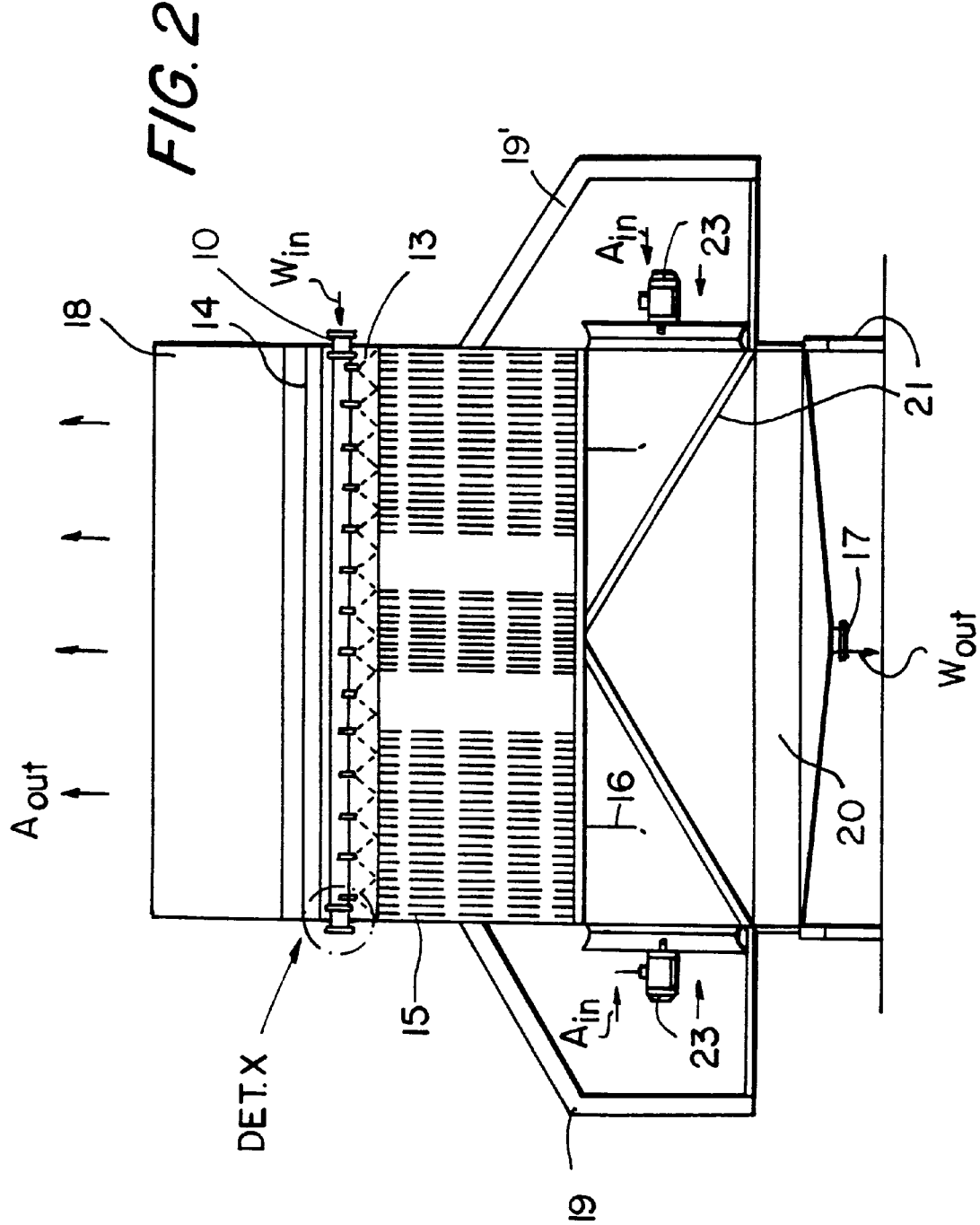
FIG. 2 is a sectional view of a cooling tower in accordance with the invention taken from the end of the tower.

FIG. 7A illustrates the detail DET.X indicated in FIG. 2. In FIG. 7A, the connecting flange 135 of the intake pipe 10 of the water Win to be cooled and the connecting flange 128 of the nozzle pipe connected to the pipe 10 are shown. In the manner shown in FIG. 7A, the jet nozzles 13 for the water to be cooled are connected to the pipe 10, which nozzles receive and discharge the water to be cooled onto the filler plates and/or pieces 15 placed underneath. FIG. 7A also shows a preferred embodiment of a drop trap placed above the intake pipe 10, which trap comprises a labyrinth-like structure.

FIG. 7B is a horizontal sectional view taken at the point A—A shown in FIG. 4. Thus, FIG. 7B shows the vertical joint between the side walls of adjacent cooling tower modules $30_n$ and $30_{n+1}$, at which joint side flanges 136 of the wall elements are placed one against the other and are connected together by means of a bolt joint 137. Between the flanges 136, the vertical separation wall between adjacent modules is also placed, if such a wall is used. By means of this wall, the water and air flows of adjacent modules $30_n$ and $30_{n+1}$ are separated. The joint shown in FIG. 7B must be tight, and, if necessary, sealing material, such as silicon, rubber, etc., is used in this joint.

FIG. 8A shows a cooling tower in which there is, in a manner known from the prior art, direct contact between the cooling air flow Ain→Aout and the water flow Win→Wout to be cooled. The water Win to be cooled comes in along the duct 10, and the cooled water Wout is passed out along the duct 12. The cooling tower shown in FIG. 8A can be used in the method in accordance with the invention, for example in the environment illustrated above in FIG. 1.

FIG. 8B is a schematic illustration of a preferred cooling tower in accordance with the invention provided with a closed circulation of water. The water Win to be cooled is passed inside a pipe 138. Raw water is passed into the cooling tower along a duct 11", which water is used to keep the outside faces of the pipes in the cooling tower moist. In this embodiment, direct contact between the cooling air flow Ain→Aout and the water flow Win→Wout to be cooled is avoided. By means of this cooling tower, the water to be cooled can be kept cleaner. In this embodiment, the cooling module thus includes blow means for blowing cooling air through an interior thereof, circulation means for circulating a water flow through the interior thereof and at least one duct or pipe 11" extending through the interior thereof. Each pipe 11" has an inlet through which water to be cooled is passed into the pipe and an outlet through which cooled water is passed. Also, each pipe 11" has an exterior surface contacted by the water flow to keep the exterior surface moist such that direct contact between the cooling air flow and the water to be cooled is avoided. As before, the amount of cooling modules and the height of each cooling module is selected in accordance with a desired cooling capacity of the cooling tower, and the cooling tower includes connecting means for mechanically interconnecting the cooling modules in parallel such that a flow of water and air through each cooling module is in the same direction.

In the following, the patent claims will be given, and the various details of the invention can show variation within the scope of the inventive idea defined in the claims and differ even to a considerable extent from the details stated above by way of example only. As such, the examples provided above are not meant to be exclusive and many other variations of the present invention would be obvious to those skilled in the art, and are contemplated to be within the scope of the appended claims.

We claim:

1. A method for reducing the consumption of fresh water and energy in a paper mill in which fresh water is passed into the paper mill for use in a papermaking process during which at least some of the water is heated and the water heated in the papermaking process is cooled by directing it through a cooling tower, the cooling tower having an associated water system for passing the heated water therein and passing cooled water therefrom, comprising the step of:

introducing at least a substantial portion of the fresh water being passed into the paper mill for the papermaking process into the cooled water being passed from the cooling tower to mix with the cooled water.

2. The method of claim 1, wherein all of the fresh water being passed into the paper mill for the papermaking process is introduced into the cooled water being passed from the cooling tower.

3. The method of claim 1, further comprising the steps of:

passing the water heated in the papermaking process and the cooled water from the cooling tower after the fresh water has been introduced into the cooled water into at least one condenser device in the water system associated with the cooling tower whereby the mixed cooled water from the cooling tower and fresh water are heated and thus constitutes warm water, and directing the warm water obtained from heating of the cooled water from the cooling tower and fresh water from the at least one condenser device into the cooling tower to be cooled.

4. The method of claim 3, further comprising the step of:

regulating the amount of warm water obtained from the at least one condenser device being passed into the cooling tower to be cooled.

5. The method of claim 1, further comprising the steps of:

passing the water heated in the papermaking process and the cooled water from the cooling tower after the fresh water has been introduced into the cooled water into at least one condenser device in the water system associated with the cooling tower whereby the mixed cooled water from the cooling tower and fresh water are heated and thus constitutes warm water, and regulating the flow of fresh water being passed into the cooled water from the cooling tower.

6. The method of claim 1, further comprising the steps of:

passing the water heated in the papermaking process and the cooled water from the cooling tower after the fresh water has been introduced into the cooled water into at least one condenser device in the water system associated with the cooling tower whereby the mixed cooled water from the cooling tower are heated and thus constitutes warm water, passing at least a portion of the warm water obtained from heating of the cooled water from the cooling tower and fresh water from the at least one condenser device into a buffer storage tank, and utilizing the warm water in the buffer storage tank in the paper mill as a substitute for fresh water.

7. The method of claim 6, further comprising the step of:

storing warm water coming from the paper mill in the buffer storage tank together with the warm water from the at least one condenser device.

8. The method of claim 5, further comprising the step of:

providing the cooling tower with an adjustable cooling capacity to determine the regulation of the flow of fresh water being passed into the cooled water from the cooling tower.

9. The method of claim 3, further comprising the step of:

regulating the temperature of the cooled water being passed from the cooling tower into the at least one condenser device.

10. A method for reducing the consumption of fresh water and energy in a paper mill in which fresh water is passed into the paper mill for use in a papermaking process during which at least some of the water is heated and the water heated in the papermaking process is cooled by directing it through a cooling tower, the cooling tower having an associated water system for passing the heated water therein and passing cooled water therefrom, comprising the step of:

introducing at least a substantial portion of the fresh water being passed into the paper mill for the papermaking process through the water system associated with the cooling tower passing the water heated in the papermaking process and the cooled water from the cooling tower into at least one condenser device in the water system associated with the cooling tower whereby the cooled water from the cooling tower is heated and thus constitutes warm water, passing at least a portion of the warm water obtained from heating of the cooled water from the cooling tower from the at least one condenser device into a buffer storage tank, and utilizing the warm water in the buffer storage tank in the paper mill as a substitute for fresh water, and storing warm water coming from the paper mill in the buffer storage tank together with the warm water from the at least one condenser device.

11. The method of claim 10, wherein all of the fresh water being passed into the paper mill for the papermaking process is introduced through the water system associated with the cooling tower.

12. The method of claim 10, further comprising the steps of:

passing the water heated in the papermaking process and the cooled water from the cooling tower into at least one condenser device in the water system associated with the cooling tower whereby the cooled water from the cooling tower is heated and thus constitutes warm water, and directing the warm water obtained from heating of the cooled water from the cooling tower from the at least one condenser device into the cooling tower to be cooled.

13. The method of claim 12, further comprising the step of:

regulating the amount of warm water obtained from the at least one condenser device being passed into the cooling tower to be cooled.

14. The method of claim 10, further comprising the step of:

passing the water heated in the papermaking process and the cooled water from the cooling tower into at least one condenser device in the water system associated with the cooling tower whereby the cooled water from the cooling tower is heated and thus constitutes warm water, and wherein the step of introducing the fresh water through the water system associated with the cooling tower comprises the steps of passing the fresh water to the at least one condenser device, and regulating the flow of fresh water being passed to the at least one condenser device.

15. The method of claim 14, further comprising the step of:

providing the cooling tower with an adjustable cooling capacity to determine the regulation of the flow of fresh water being passed to the at least one condenser device.

16. The method of claim 10, wherein the fresh water is introduced into the cooled water being passed from the cooling tower to mix with the cooled water.

17. The method of claim 10, further comprising the step of:

regulating the temperature of the cooled water being passed from the cooling tower into the at least one condenser device.

* * * * *